US005449481A

United States Patent [19]

Sagawa et al.

[11] Patent Number: 5,449,481

[45] Date of Patent: Sep. 12, 1995

[54] METHOD AND APPARATUS FOR PRODUCING A POWDER COMPACT

[75] Inventors: Masato Sagawa; Hiroshi Nagata; Osamu Itatani, all of Kyoto, Japan

[73] Assignee: Intermetallics Co., Ltd., Kyoto, Japan

[21] Appl. No.: 155,229

[22] Filed: Nov. 22, 1993

[30] Foreign Application Priority Data

Nov. 30, 1992 [JP] Japan .................................. 4-333766
Oct. 22, 1993 [JP] Japan .................................. 5-287627

[51] Int. Cl.[6] .............................................. B29C 43/02

[52] U.S. Cl. .................................... 264/123; 264/109; 425/352; 425/410

[58] Field of Search ................ 264/109, 123; 425/352, 425/355, 406, 410

[56] References Cited

U.S. PATENT DOCUMENTS 2,091,973 9/1937 Fessler et al. ........................ 425/352
2,558,823 7/1951 Crowley et al. .................... 425/352
3,089,189 5/1963 Feldman et al. ..................... 425/406
5,024,811 6/1991 Hinzmann et al. ................. 264/109

FOREIGN PATENT DOCUMENTS

0488334A2 6/1992 European Pat. Off. .
51-001957 8/1993 Japan .
1355521 6/1974 United Kingdom .

*Primary Examiner*—Mary Lynn Theisen
*Attorney, Agent, or Firm*—Fish & Richardson

[57] ABSTRACT

Methods and apparatuses for producing a powder compacts are disclosed. A powder compaction apparatus includes a recess formed by die and a lower punch inserted into the die. The recess is loaded with rubber mold provided with a cavity shaped according to the desired configuration of the compact. Subsequently, the powder is packed in the cavity of the rubber mold, and an upper punch is placed on die to press the rubber mold with powder in the space formed by the die, the lower punch and the upper punch, thereby producing a powder compact.

13 Claims, 7 Drawing Sheets

METHOD AND APPARATUS FOR PRODUCING A POWDER COMPACT

BACKGROUND OF THE INVENTION

1. Field of the Invention

The present invention relates to methods and apparatuses for producing a powder compact using powders for the production of permanent magnets, soft magnetic materials, electric and electronic materials, tool materials, and various parts used in a variety of industrial fields. The powder packed in a rubber mold is pressed by using the pressure of the punches of a die press machine and deformation of rubber so as to produce a powder compact. This type of pressing is hereinafter referred to as "rubber mold die pressing."

2. Discussion of the Related Art

One of the known pressing technologies is the rubber mold die pressing method disclosed in Japanese Unexamined Patent Publication No. 55-26601. In this method, a rubber mold is loaded in a die secured to the table of a die press machine, and the cavity provided in the rubber mold is filled with a rare-earth cobalt alloy powder. The upper punch is subsequently lowered to carry out the die pressing. By using a rubber mold as a pressure medium, this method made it possible to produce rare-earth cobalt magnets with improved magnetic properties as high as those by transverse die pressing.

Referring to the prior rubber mold die pressing methods mentioned above, as well as to FIG. 8 illustrating the apparatus to implement those methods, the problems that the present invention intends to solve are described below.

Referring to FIG. 8, an indexed table 1 turns intermittently, driven by an appropriate means provided in a base table 2. A described number of dies M, which number is determined according to the number of steps for the production of compacts, are placed on the indexed table 1. In FIG. 8, only one die M placed at the die pressing stage is shown, while the dies assigned for other stages are omitted.

Die M comprises a cylindrical die d (hereinafter simply referred to as the "die") fixed to the indexed table 1 and a lower punch p1 with a height less than die d is inserted into the die. A rubber mold m is loaded, in recess 3 (hereinafter referred to as the "die cavity") formed by die d and lower punch p1 inserted in the die. Rubber mold m is provided with a recess (hereinafter referred to as the "rubber cavity") which is designed in accordance with the desired configuration of the compact to be formed.

Rubber cavity m' is filled with a powder in the process on the indexed table 1. Then die M, whose cavity 3 is loaded with the rubber mold m filled with powder, is transferred to the die pressing stage by the intermittent turning of the indexed table 1 as shown in FIG. 8.

An upper punch p2 is inserted into die d attached to the end of a cylinder rod 5 of a fluid cylinder 4. A magnetic field generator coil 6 is connected with the cylinder rod 5 or the like. When a magnetic powder is oriented to produce permanent magnets, the cylinder rod 5 or the like is provided with the magnetic field generator coil 6. A horizontal frame is used to locate the fluid cylinder 4. The horizontal frame 7 is mounted on vertical frames 8 and 8' placed on the floor f.

In the die press machine constructed as above, after the positioning of the upper punch p2 and the die cavity 3, the upper punch p2 is inserted into the die d, and then the fluid cylinder 4 works to push down the upper punch p2 so that rubber mold m filled with powder is pressed in the space formed by die d, lower punch p1 both of which are secured to the base of the die press machine and the upper punch p2. Due to the downward movement of the upper punch p2 and inward shrinking of rubber cavity m', the thickness of the rubber mold m is reduced, thereby producing a powder compact from the powder packed in the rubber mold.

The conventional rubber mold die pressing method must include an accurate positioning for die M to be transferred to the die pressing stage by the intermittent turning of indexed table 1, because the upper punch p2 needs to be inserted into die cavity 3. Accordingly, the intermittent turning system of the indexed table 1 must be provided with the function of accurate positioning, which makes the apparatus very complex and expensive. Also, this type of apparatus requires frequent checks and maintenance.

If a clearance exists between the outer circumference of the upper punch p2 and the inner circumference of die d, the rubber mold m gets caught in this clearance upon pressing. This causes many problems such as damage to the rubber mold, ascent of the rubber mold when pulling out the upper punch from the die, and cracks and fractures in the compact due to the unnecessary force placed on the rubber mold.

For the reasons above, the upper punch p2 and the die d must be made as precisely as possible. However, the more precisely the upper punch and the die are fabricated, the more accurate positioning must be carried out by the intermittent turning system table 1.

The need for more accurate positioning complicates the turning system and the construction of the die press machine, which causes more disorders, and therefore requires more frequent maintenance.

In the apparatus above, when the upper punch p2 is lowered, the rubber mold m is pressed in the space formed by the die d, the lower punch p1 and the upper punch p2. Following pressing, the thickness of the rubber mold m is reduced and the rubber cavity m' shrinks inwardly, while due to the compression of rubber mold by the lowering of upper punch p2, rubber mold m works to press the inner wall of the die d, causing the generation of a very large frictional force between the rubber mold m and the die d.

The very large frictional force generated between the die d and the rubber mold m affects the compressing power applied to the powder filling the rubber cavity. This is especially true when the rubber cavity m' is deep. This is because while the upper part of the rubber cavity receives sufficient compressing power, the part deep in the rubber cavity cannot get enough power. As a result, the powder compact is not uniform in density, and it is likely to break apart when insufficiently pressed.

SUMMARY OF THE INVENTION

Accordingly, it is an object of the invention to solve the problems mentioned above that the conventional powder compacting methods suffer, as well as to provide methods and apparatuses for producing a powder compact with superior productivity and easier maintenance.

To achieve the objects stated above among others, the present invention proposes the methods and apparatuses featured as follows. A method for producing a powder compact comprises the steps of loading a rubber mold provided with a cavity which is shaped according to the desired configuration of the compact into a recess formed by a die and a lower punch inserted therein; filling the cavity of the rubber mold with a powder; placing an upper punch on the die; and pressing the rubber mold with the powder in the space formed by the die, the lower punch and the upper punch to obtain a powder compact from the powder filling the rubber mold.

An apparatus for producing a powder compact comprises a die, a lower punch inserted into the die, a rubber mold loaded in a recess formed by the die and the lower punch inserted into the die, and an upper punch placed on the die.

A method for producing a powder compact comprises the steps of loading a rubber mold provided with a cavity which is shaped according to the desired configuration of the compact to be made into a recess formed by a die and a lower punch inserted into the die; filling the cavity of the rubber mold with a powder; placing an upper punch on the die; and pressing the rubber mold with the powder in the space formed by the die, the lower punch and the upper punch, wherein the die and the rubber mold are moved relative to each other.

An apparatus for producing a powder compact comprises a die, a lower punch inserted into the die, a rubber mold loaded in a recess formed by the die and the lower punch, an upper punch placed on the die, and a device for supporting the die through springs.

Because of the construction in which the upper punch is not inserted into the die but contacts at its bottom with the top of the die carrying out the die pressing, the positioning of the indexed table does not have to be as accurate as required in the prior art. The time for positioning the die is therefore shortened and the productivity is enhanced.

BRIEF DESCRIPTION OF THE DRAWINGS

The above and other objects and features of the present invention will be apparent to those skilled in the art from the following description of the preferred embodiments thereof when considered in conjunction with the appended drawings in which.

DETAILED DESCRIPTION OF THE PREFERRED EMBODIMENTS

Several examples of this invention are hereinafter described with reference to FIGS. 1 to 7. However, the present invention is not at all limited to these examples.

Figure 1:
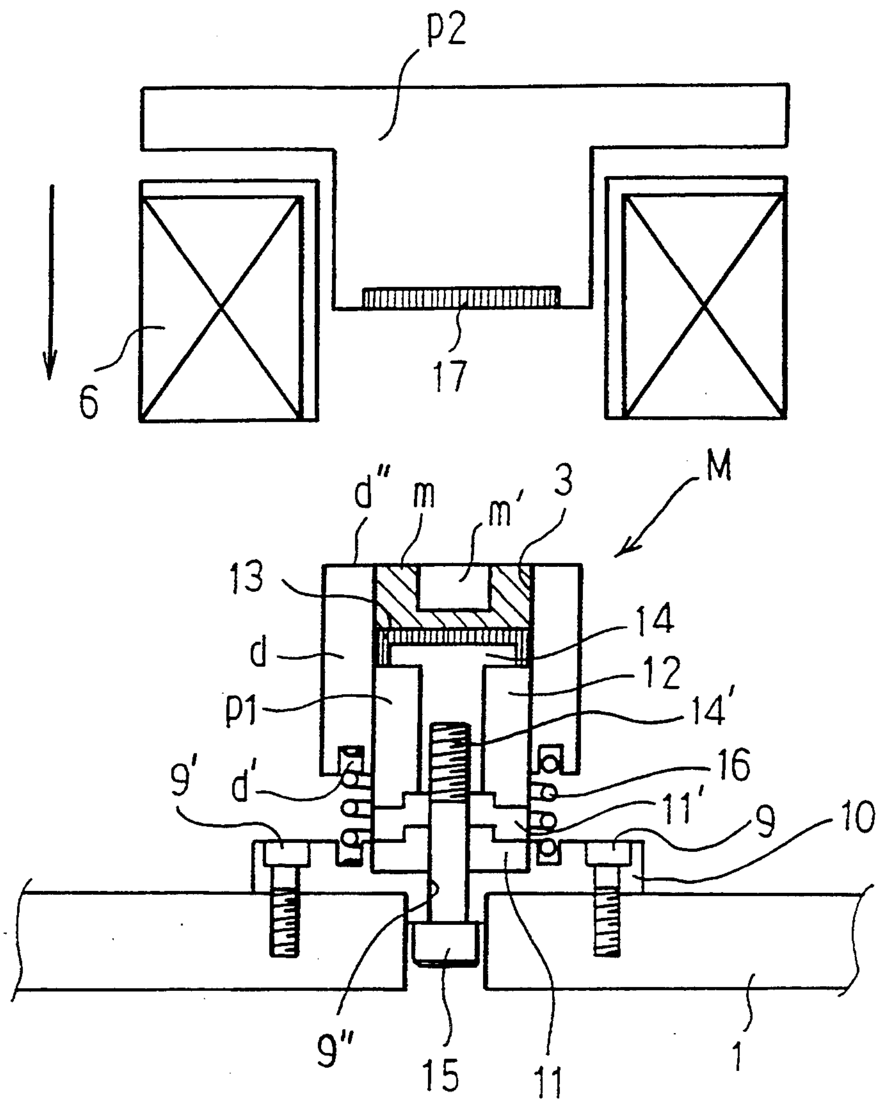
FIG. 1 illustrates a vertical elevation and partial sectional view of a die press machine comprising a die, an upper punch and other components located at the die pressing stage in an indexed table.

FIG. 1 illustrates an apparatus for die pressing comprising a die M and an upper punch p2 and other components which are located at the die pressing stage of indexed table 1.

Lower punch p1 comprises:

1) spacers 11 and 11' for adjusting the depth of die cavity 3 are placed on supplemental support plate 10 fixed to indexed table 1 with bolts 9 and 9';
2) the body 12 of the lower punch; and
3) an attachment tool 14 for back-up ring 13 inserted into the body 12 of the lower punch on whose top a back-up ring or plate (hereinafter referred to as "back-up ring") 13 is attached.

After spacers 11 and 11', the body 12 of the lower punch and attachment tool 14 are assembled by a bolt 15 inserted into throughhole 9" provided in a supplemental support plate 10 is screwed into screw hole 14', thereby securing the lower punch p1 to indexed table 1.

The bottom of die d into which lower p1 is inserted is provided with groove d'. Between groove d' and supplemental support plate 10, springs 16 are provided so as to surround lower punch p1.

The springs 16 can be compressive springs made of nonmagnetic stainless steel, as well as rubber cushions using hard urethane rubber, flush springs, fluid cylinders functioning as a spring and various other springs may be used. Particularly preferred springs are flush springs with a large spring coefficient which allow easy adjustment of the length and the coefficient and the like.

In particular, flush springs made of nonmagnetic steel are preferable because they do not generate shock due to the magnetic attraction upon application of a pulsed magnetic field.

As is described above, the rubber mold m with rubber cavity m' filled with powder is loaded in the die cavity 3 which is formed by the die d and the lower punch p1 inserted into the die.

The upper punch p2 is placed on the top surface d" of die d and is constructed to be larger than the top surface area of die cavity 3 so that it covers the die cavity. That is, in the present invention, the upper punch is not inserted into the die cavity, but placed on the top surface d" of the die.

A back-up ring 17 comprises a hard rubber or the like which is attached to the bottom of the upper punch p2 as the need arises. The back-up ring 17 prevents the rubber mold m from sticking out from the clearance between d" and the bottom of upper punch p2, thereby enhancing the life of the rubber mold m.

When attaching the back-up ring 17 to the bottom of the upper punch p2, the back-up ring 17 should be made larger than the top surface area of the die cavity 3 so that it covers the die cavity 3 or the boundary between the die d and the rubber mold m.

In the latter case, at the area surrounded by the back-up ring 17 in the bottom of the upper punch p2, the material of the upper punch p2 is exposed.

When this area contacts with the rubber mold m upon pressing, the frictional force generated may be so great that it impedes necessary deformation of rubber mold m. To prevent such a problem, the surface of this area should be finished as smooth as possible, for example, by coating.

As shown in FIG. 1, where the die M incorporating the rubber mold m with rubber cavity m' which is filled with powder prior to the die pressing, is transferred to the position for the die pressing by the intermittent turning of indexed table 1, the upper punch p2 is moved down and placed on the top d'' of the die d. Upon further lowering of the upper punch p2, the die d is moved down along with the upper punch p2 against the resistance of the springs 16 provided between the die d and the supplemental support plate 10.

As the lowering the upper punch p2 and the die d reduces the space formed by the die d, the lower punch p1 and the upper punch p2 i.e., die cavity 3, the rubber cavity m' shrinks inwardly so that the powder filling the cavity is compressed to form a powder compact.

As has been discussed, in the die pressing process of the present invention, the upper punch p2 is not inserted into the die d, but simply placed on the top surface d'' of the die. As a result, the positioning of indexed table 1 does not have to be as accurate as the conventional die pressing. Thus, this arrangement saves the time for positioning and improves productivity.

Furthermore, this arrangement simplifies the construction of the apparatus for producing a powder compact because it is not necessary for the apparatus to be equipped with such a precise system for positioning the upper punch. This simplification reduces the cost of the apparatus, lowers the amount of maintenance, and reduces the production costs.

Further, since the upper punch p2 is not inserted into the die d, the rubber mold m does not get caught in the clearance between the outer wall of the upper punch p2 and the inner wall of die d. Therefore, problems such as cracks in rubber mold m and damage to the compacts can be prevented.

In addition, because the die d moves down along with the upper punch p2, the friction generated between the rubber mold m and the die d can be reduced. Accordingly, the rubber mold m deforms uniformly in the direction perpendicular to the moving direction of the upper punch p2, and such deformation promotes the pseudoisostatic compaction of the powder packed in the rubber cavity. A powder compact with a uniform packing density can therefore be obtained.

Figure 2:
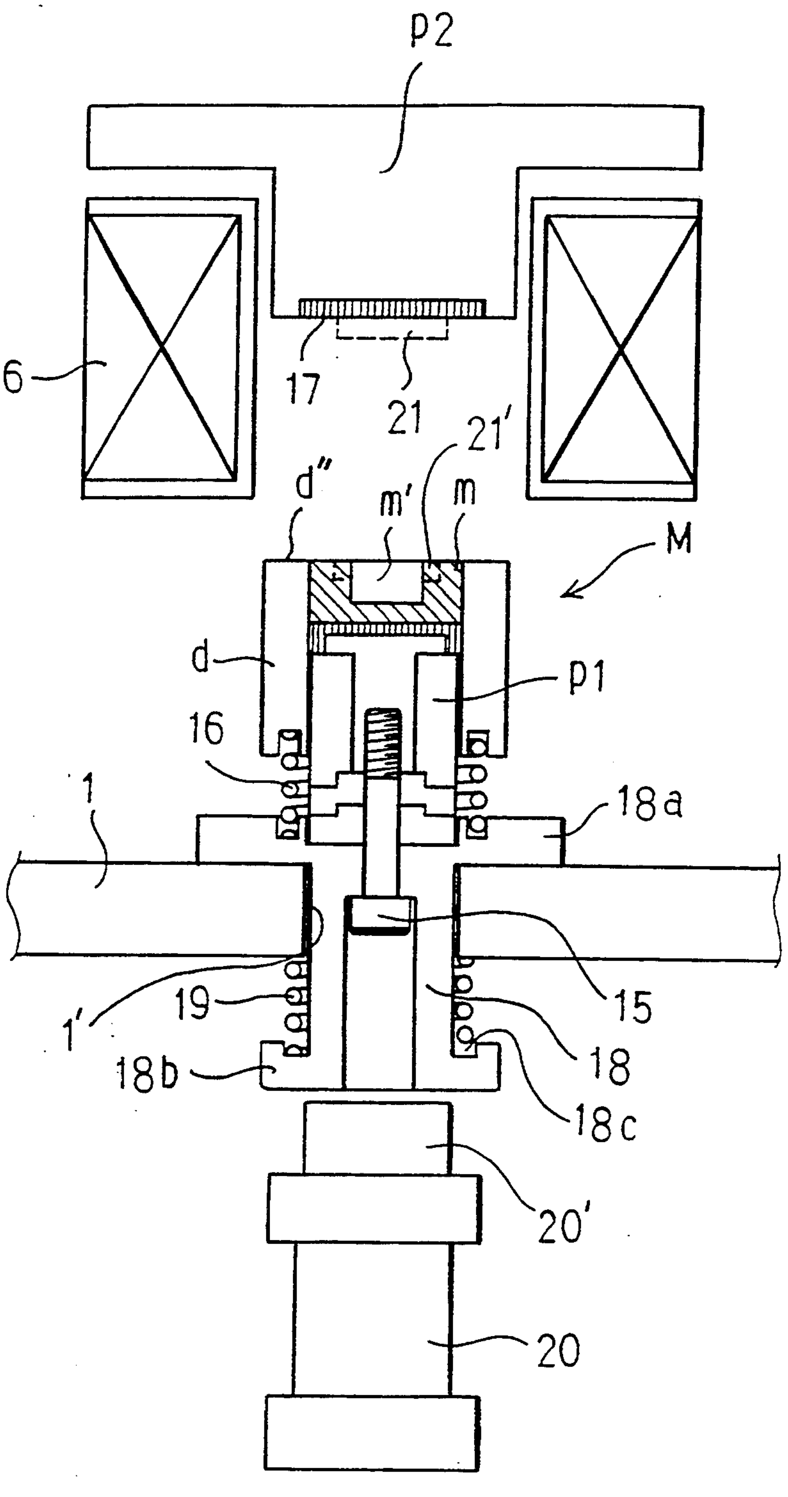
FIG. 2 illustrates a vertical elevation and partial sectional view of another embodiment of the die press machine of this invention comprising a die, an upper punch and other components located at the die pressing stage in an indexed table similar to that is shown in FIG. 1.

FIG. 2 illustrates another embodiment of the die pressing apparatus showing a die M, an upper punch p2 and other components located at the die pressing stage of indexed table 1.

In this embodiment, the lower punch p1 is fixed with a bolt 15 to a slider 18 which is inserted in a throughhole 1' provided in the indexed table 1 in a vertically slidable manner.

At the upper and lower ends of the slider 18, an upper flange 18*a* and the lower flange 18*b* are provided. Between groove 18*c* in the lower flange 18*b* and the indexed table 1, compressive springs 19 are provided surrounding the slider 18. These springs 19 are intended to usually help slider 18 move downward.

A pressure applier 20, such as a fluid cylinder or a mechanical pressure applier, is provided with a vertically movable piston 20'. Due to the pressure from this pressure applier, the piston 20' moves up and down so that it also moves the lower punch p1 vertically.

When pressing the powder in a rubber cavity m', first, the upper punch p2 is lowered until its bottom comes into contact or nearly into contact with the top surface d'' of die d and then the lowering is stopped.

Subsequently, the pressure applier 20 is energized to move the piston 20' so that the piston 20' pushes up the lower punch p1 secured to the slider 18, against the resistance of springs 16 and compressive springs 19.

Die d stops ascending when contacted with the bottom of the upper punch p2, while lower punch p1 continues to move upward pushed by the piston 20'.

As a result, as the space or the die cavity 3 which is formed by die d, lower punch p1 and upper punch p2 reduces its depth, rubber cavity m' shrinks inwardly. Thus a powder compact is obtained from the powder filling the rubber cavity.

This embodiment in FIG. 2 is provided with a magnetic field generator coil 6. However, when the magnetic alignment of the powder is not necessary this coil 6 can be omitted. Die pressing may then be carried out by lifting the lower punch p1 with the pressure applier 20 with upper the punch p2 secured.

The dotted line 21 is a cover made of rubber attached to the back-up ring 17 and is designed to be inserted into the rubber cavity m'.

The cover 21 is optional. However, for certain configurations of the compact, the cover 21 should preferably be used, because the isostatic pressure becomes more uniform and generation of cracks in the compact can therefore be prevented.

Cover 21 is made of an elastic rubber such as is used for rubber mold m. Since rubber expands in the horizontal direction when pressed, it can fill the gap between the side wall of cover 21 and rubber cavity m' even if the gap is considerably large. Therefore, the powder is kept in the rubber cavity without flowing out upon pressing. In addition, rubber is so easy to deform that it deforms itself to fit into die d, even if die d has swerved from the right position. Accordingly, there is no particular need for a strict positioning of the cover. A part of the inner wall of rubber mold m may occasionally be recessed so that cover 21 can fit into the recess 21' (indicated by a dashed line in FIGS. 2 and 6).

The embodiment in FIG. 2 has the same effects as those of the embodiment in FIG. 1.

Figure 3:
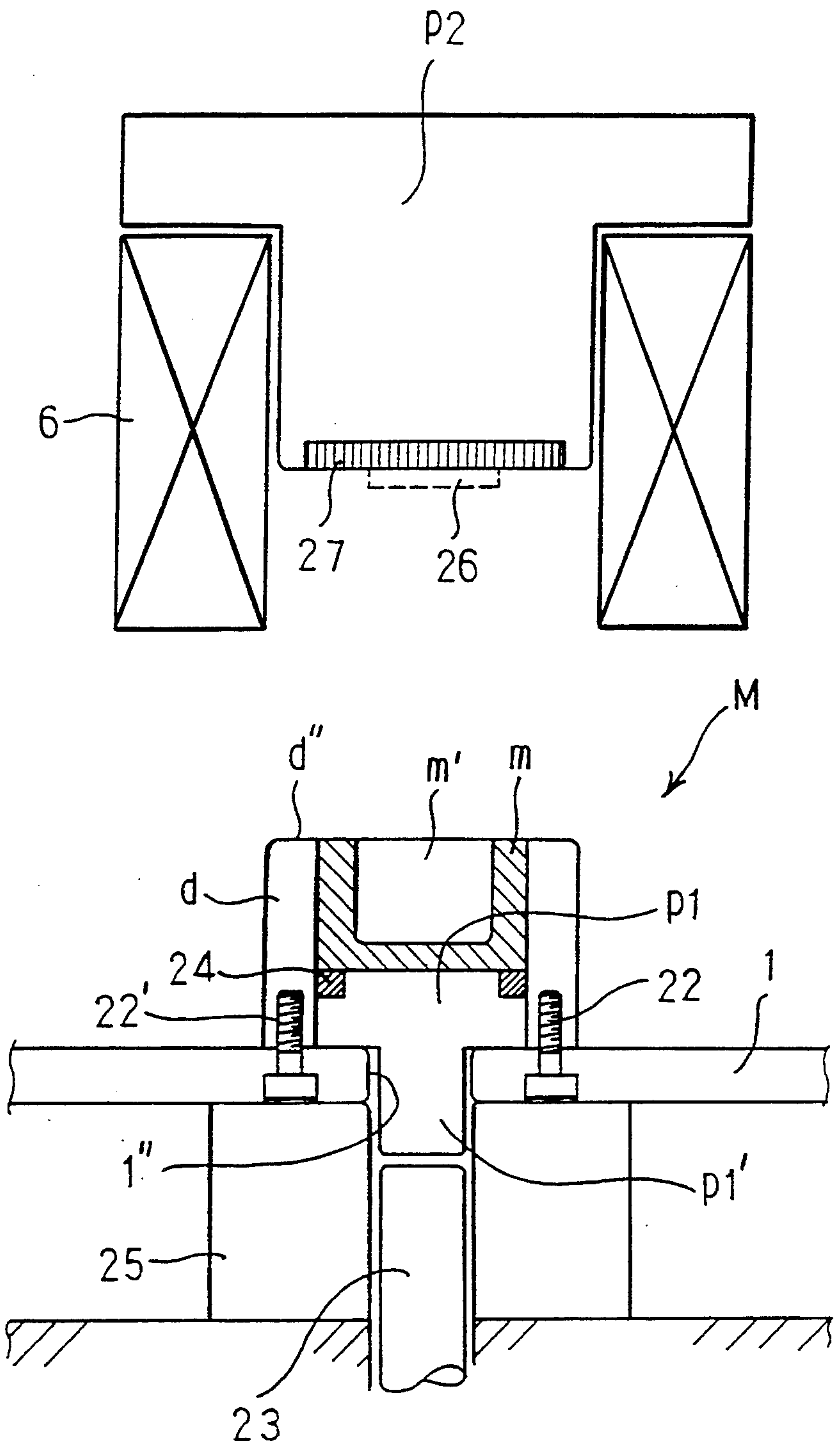
FIG. 3 illustrates a vertical elevation and partial sectional view of a die pressing apparatus comprising a die, an upper punch and other components located at the die pressing stage in an indexed table similar to that in FIG. 1.

FIG. 3 illustrates an embodiment other than those in FIGS. 1 and 2, showing a die M, an upper punch p2 and other components located at the die pressing stage of indexed table 1.

In FIG. 3, a die d is fixed to the indexed table 1 with bolts 22 and 22'. A column part p1' constituting the lower part of lower punch p1 penetrates the indexed table 1 in throughhole 1'' and protrudes downward.

A piston 23 is provided under column p1 of the lower punch 1. The piston 23 moves up and down driven by a pressure applier (not shown).

A back-up ring 24 is attached to the lower punch p1 so as to prevent rubber mold m from getting caught between die d and lower punch p1, and is provided when the need arises.

A pressure support table 25 is provided under the indexed table 1 with a desired space therebetween. The pressure support table 25 supports the indexed table 1 during die pressing so as to reduce the pressure applied to the indexed table 1. This may be provided when necessary.

When pressing the powder filling rubber cavity m', first, the upper punch p2 is lowered until it comes into contact or nearly into contact with the top surface d" of die d, and then the lowering of the upper punch p2 is stopped.

As the piston 23 is moved up along the die d fixed to the indexed table 1 so as to lift the lower punch p1, the space formed with the die d, the lower punch p1 and the upper punch p2 shrinks i.e., the depth of the die cavity 3 is reduced. As a result, the rubber cavity m' of the rubber mold m loaded in the die cavity 3 shrinks inwardly pressing the powder so as to produce a powder compact.

The embodiment in FIG. 3 is different from those in FIGS. 1 and 2, because the die d is fixed to the indexed table 1. In this embodiment, although it may not be possible to reduce the frictional force generated between the die d and the rubber mold m, the positioning of indexed table 1 does not have to be so accurate because the upper punch p2 is not inserted into die d but simply placed on the top surface d" of the die. Therefore, effects such as saving positioning time and improving the productivity may be expected.

The apparatus shown in FIG. 3 may be used when using a rubber mold m with a relatively small height to produce a thin compact, because the unevenness of the pressure applied to the powder resulting from the frictional force between the die d and the rubber mold m does not seriously affect the uniformity of the powder density in the compact.

A cover 26 is made of rubber attached to the bottom of the back-up ring 27 in the same manner as the cover 21 in the embodiment shown above.

Figure 4:
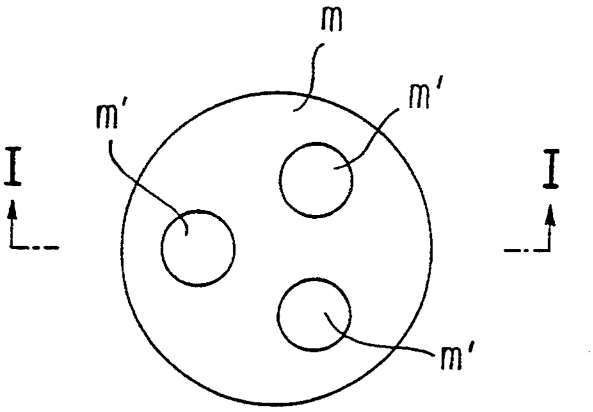
FIG. 4 is a plan view of a rubber mold for shaping a plurality of powder compacts at one time.

FIG. 4 is a plan view of rubber mold m provided with a plurality of rubber cavities m'.

Figure 5:
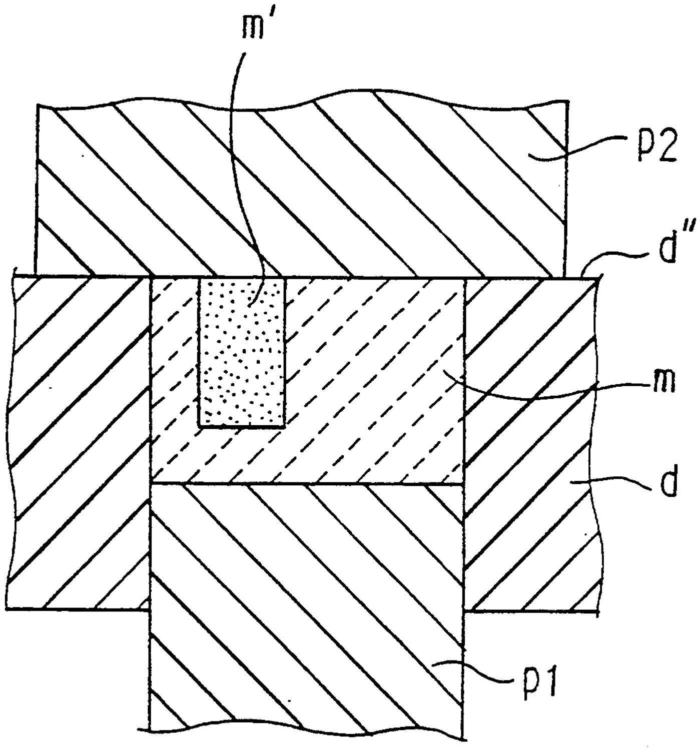
FIG. 5 is an enlarged sectional view taken along the line I—I of FIG. 4 including the upper punch, the lower punch and the die.

FIG. 5 is a cross section taken on line I—I, including the lower punch p1, the upper punch p2 and the die d.

FIG. 4 illustrates the rubber mold m with several rubber cavities m' which are used to produce several powder compacts at one pressing. The rubber cavities m' are filled with powder and then pressed with an apparatus as shown in FIGS. 1, 2, and 3. As a result, as shown in FIG. 5, the depth of the space formed by the die d, the lower punch p1 and the upper punch p2 i.e., the depth of die cavity 3, is reduced and rubber cavity m' shrinks inwardly, thereby producing a plurality of powder compacts.

Figure 6:
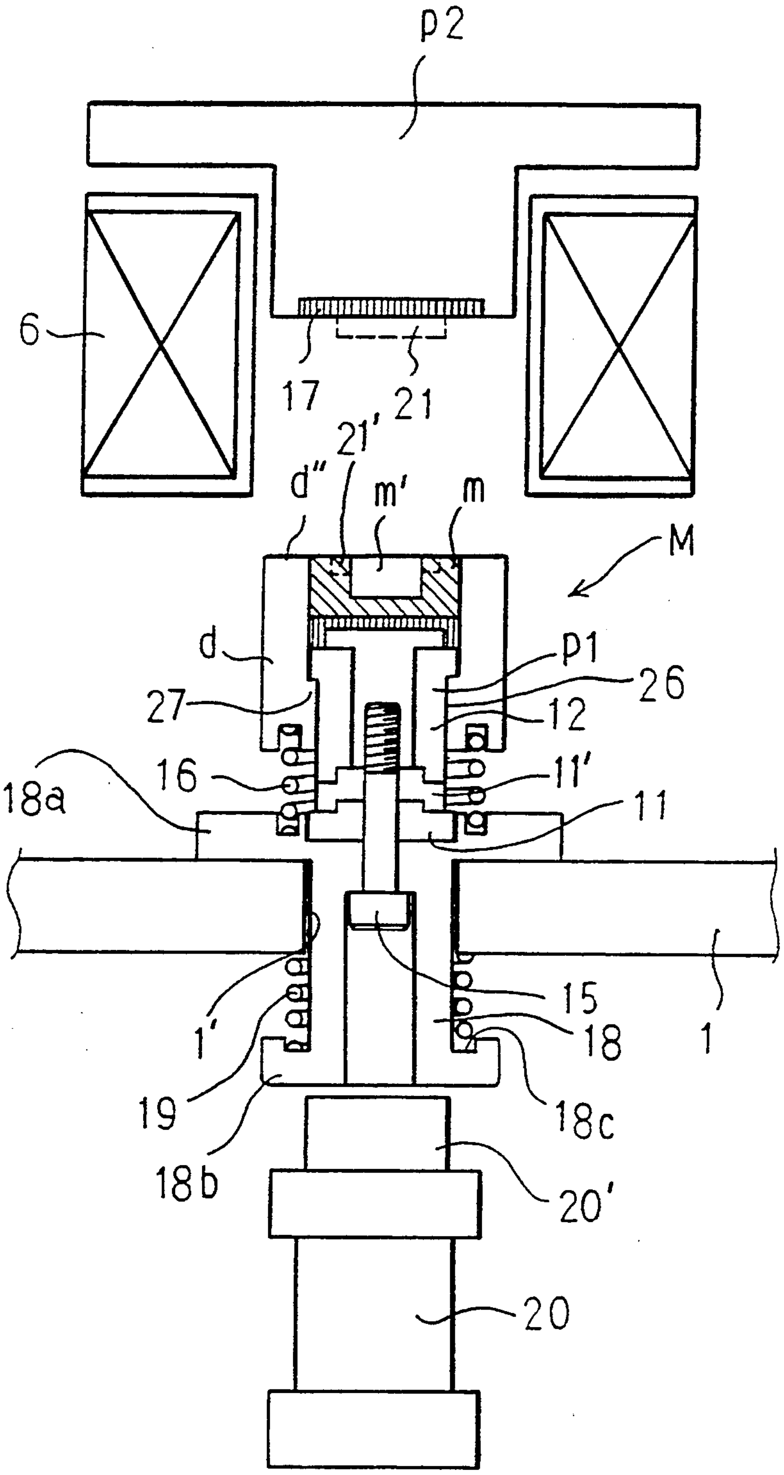
FIG. 6 is an elevational and partial sectional view of a modification of the die press machine in FIG. 2 comprising a die, an upper punch and other components located at the die pressing stage in an indexed table.

FIG. 6 is a different version of the die press machine shown in FIG. 2, in which the lower punch p1 is provided with a concave part 26 in its outer surface to which a convex part 27 provided in the lower interior of the die d is fitted.

By fitting the concave part 26, provided in the outer surface of lower punch p1, to the convex part 27 in the lower interior of the die d, the die d can be prevented from coming apart from die M.

Concave part 26 can be formed in the outer surface of the lower punch p1 by making the wall thicknesses of the lower punch p1 (excluding its upper section) and the upper spacer 11' thinner than usual. The lower spacer 11 can be formed to have the usual wall thickness.

Therefore, when fitting the die d to the lower punch p1, first, die d is fitted to the body 12 of the lower punch p1 and the upper spacer 11' and then the lower spacer 11 is attached thereto.

Upon reading the present disclosure, it will become obvious to those skilled in the art that the construction as described above in which the convex part 27 provided in the lower interior of the die d is fitted into the concave part 26 provided in the outer surface of the lower punch p1 can also be applied to the die press machine shown in FIG. 1.

Figure 7:
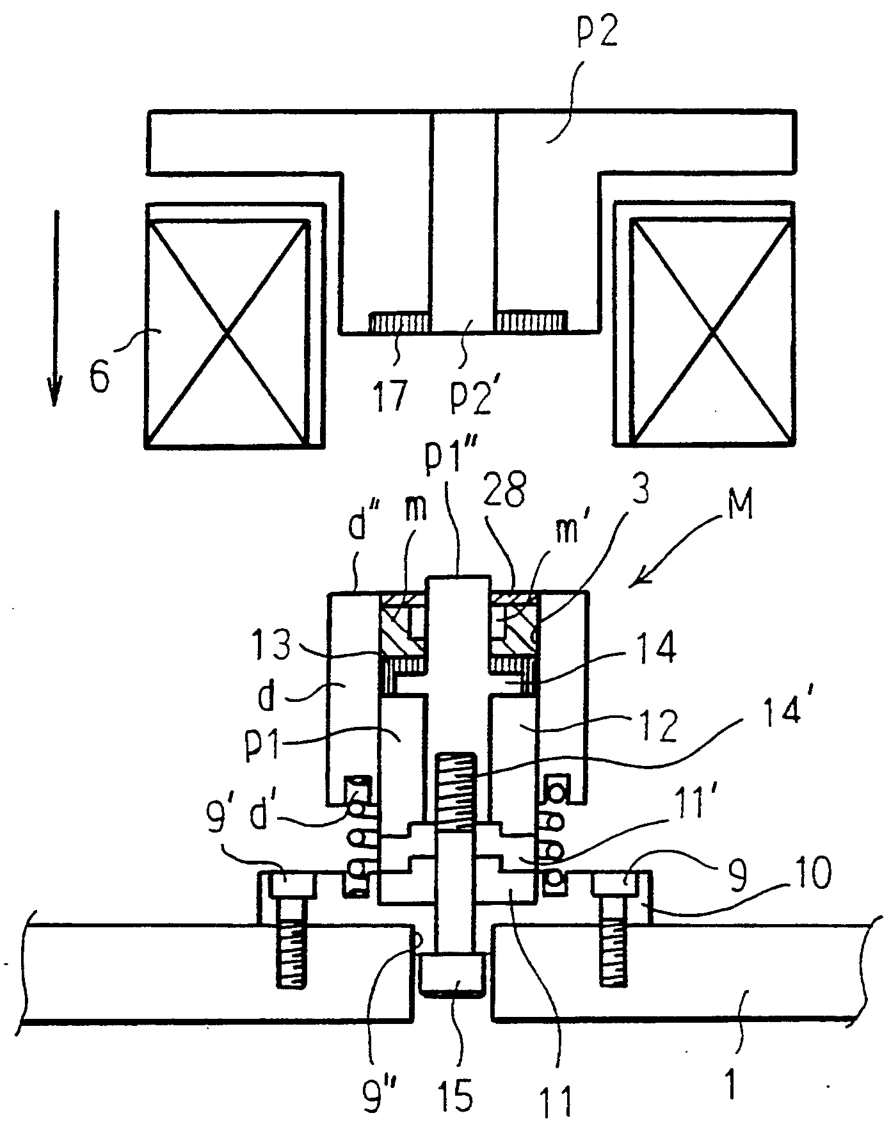
FIG. 7 is an elevational and partial sectional view of another modification of the die press machine in FIG. 2 comprising a die, an upper punch and other components located at the die pressing stage in an indexed table.
Figure 8:
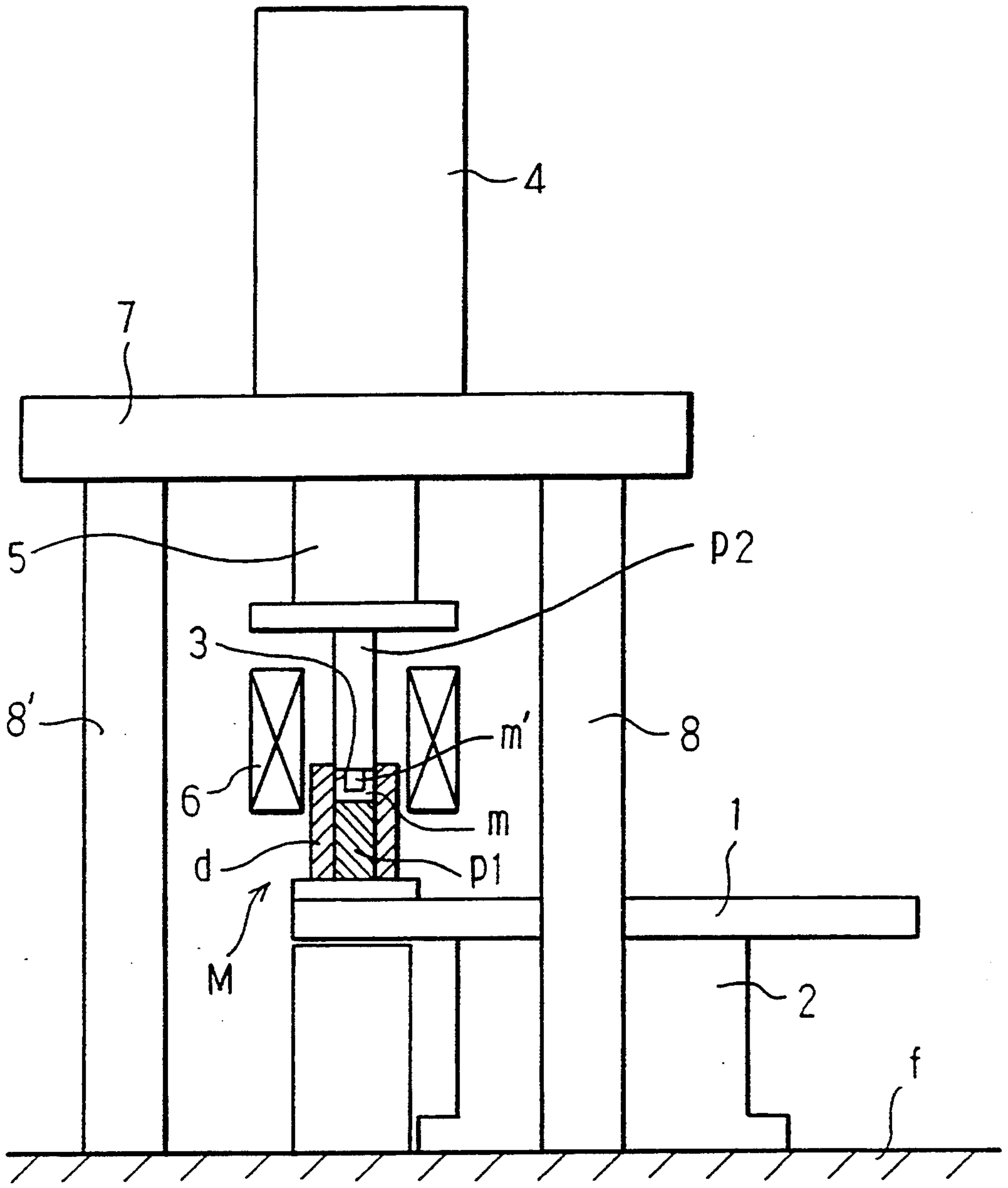
FIG. 8 PRIOR ART
FIG. 8 illustrates and a front partial sectional view of a conventional die press machine comprising a die, the upper punch and other components located at the die pressing stage in an indexed table.

FIG. 7 illustrates a modification of the apparatus in FIG. 1 in which the upper end of the lower punch p1 is extended penetrating the rubber mold m so that its top is higher than the top d" of the die d. This apparatus is intended to produce hollow compacts.

Meanwhile, the upper punch p2 is provided with a throughhole or a recess p2' so that the upper end p1" of lower punch p1' is fitted therein. A cover 28 is made of the same rubber as the rubber mold m.

In this embodiment, the same process as that in FIG. 1 is carried out to produce a hollow compact.

Upper punch p2 is lowered so that the end p1" of the lower punch p1 is fitted into the throughhole or recess p2' in the upper punch p2, when the upper punch p2 is placed on the top surface d" of die d. While the upper punch p2 is further lowered, the die cavity 3 formed by the die d, the lower punch pl and the upper punch p2 and containing rubber mold m, reduces its depth as well as the rubber cavity m' shrinks inwardly, thereby producing a hollow, cylindrical powder compact from the powder filling rubber cavity m'.

This structure may of course be applied to the die press apparatuses in FIGS. 2, 3 and 6.

With the constructions described above, the present invention has the following effects.

The pressing is carried out not by inserting the upper punch into the die but by contacting the bottom of the upper punch with the top of the die. Therefore the accurate positioning of the indexed table is not required and this saves positioning time and improves productivity.

Further, because the intermittent turning system of the indexed table does not have to include devices for very accurate positioning, the structure of the apparatus can be simplified, which leads to easy maintenance of the apparatus and to a reduction in production costs.

Additionally, the problem that the rubber mold gets caught between the outer wall of the upper punch and the inner wall of the die does not arise when the upper punch is contacted at its bottom with the top of the die. Thus, damages to the rubber mold and products can therefore be prevented.

Furthermore, since the structure of the present invention is intended to make the die and the rubber mold move relative to each other, the frictional force between the rubber mold and the die is reduced, enabling the rubber mold to deform uniformly in a direction perpendicular to the moving direction of the upper punch. Such a deformation promotes the pseudoisostatic compaction of the powder in the rubber cavity, and as a result, a uniformly densified powder compact is obtained.

The present invention has been described in connection with certain structural embodiments and it will be understood that various modifications can be made to the above-described embodiments without departing from the spirit and scope of the invention as defined in the appended claims.

What is claimed is:

1. A method for producing a powder compact comprising:

loading a rubber mold provided with a cavity, which is shaped according to a desired configuration of the powder compact, into a recess formed by a die and a lower punch inserted into the die;

filling the cavity of the rubber mold with powder;

placing an upper punch in contact with an opposing surface of the die; and pressing the rubber mold filled with powder in a space formed by the die, the lower punch and the upper punch to obtain the powder compact.

2. A method for producing a powder compact according to claim 1, further comprising securing the lower punch prior to said placing the upper punch in contact with the opposing surface of the die, and wherein said pressing comprises lowering the upper punch, thereby obtaining a powder compact from the powder filling the rubber mold.

3. A method for producing a powder compact according to claim 1, further comprising securing the upper punch prior to said placing the upper punch in contact with the opposing surface of the die, and wherein said pressing comprises lifting the lower punch, thereby obtaining a powder compact from the powder filling the rubber mold.

4. A method for producing a powder compact according to claim 1, wherein said pressing includes lifting the lower punch and lowering the upper punch so that the rubber mold with powder is pressed, thereby obtaining a powder compact from the powder filling the rubber mold.

5. An apparatus for producing a powder compact comprising a die, a lower punch inserted into said die, a rubber mold loaded in a recess formed by said die and said lower punch inserted into said die, and an upper punch having a bottom surface adapted to be placed on an opposing surface of said die.

6. An apparatus for producing a powder compact according to claim 5, further comprising a driving device disposed above said die for lowering said upper punch.

7. An apparatus for producing a powder compact according to claim 5, further comprising a driving device disposed below said die for lifting said lower punch.

8. An apparatus for producing a powder compact according to claim 5, further comprising a first driving device disposed above Said die for lowering said upper punch and a second driving device disposed below said die for lifting said lower punch.

9. A method for producing a powder compact comprising:

loading a rubber mold provided with a cavity, which is shaped according to a desired configuration of the powder compact, into a recess formed by a die and a lower punch inserted into the die;

filling the cavity of the rubber mold with powder;

placing an upper punch in contact with an opposing surface of the die; and pressing the rubber mold filled with powder in a space formed by the die, the lower punch and the upper punch to obtain a powder compact, said pressing comprising moving the die and the rubber mold relative to each other.

10. An apparatus for producing a powder compact comprising a die, a lower punch inserted into said die, a rubber mold loaded in a recess formed by said die and said lower punch inserted into said die, an upper punch placed on the die, and a supporting device which holds the die, said supporting device comprising at least one spring.

11. An apparatus for producing a powder compact according to claim 10, wherein said upper punch has a diameter which is greater than a diameter of the recess.

12. A method for producing a powder compact comprising:

loading a rubber mold provided with a cavity, which is shaped according to a desired configuration of the powder compact, into a recess formed by a die and a lower punch inserted into the die;

filling the cavity of the rubber mold with powder; and pressing each of the die and the rubber mold with an upper punch such that the die is downwardly displaced and the rubber mold is compressed.

13. A method for producing a powder compact according to claim 12, wherein said pressing does not displace the lower punch.

* * * * *